United States Patent
Koyama (10) Patent No.: US 7,228,068 B2
(45) Date of Patent: Jun. 5, 2007

(54) LENS BARREL STRUCTURE AND IMAGE CAPTURE APPARATUS

(75) Inventor: Takashi Koyama, Tokyo (JP)

(73) Assignee: Sony Corporation (JP)

( * ) Notice: Subject to any disclaimer, the term of this patent is extended or adjusted under 35 U.S.C. 154(b) by 189 days.

(21) Appl. No.: 11/092,895

(22) Filed: Mar. 30, 2005

(65) Prior Publication Data

US 2005/0238342 A1 Oct. 27, 2005

(30) Foreign Application Priority Data

Apr. 8, 2004 (JP) .......................... P2004-114393

(51) Int. Cl.
G03B 17/00 (2006.01)
(52) U.S. Cl. ...................................... 396/87
(58) Field of Classification Search ............ 396/85–87, 396/144; 359/823, 824
See application file for complete search history.

(56) References Cited

U.S. PATENT DOCUMENTS

2002/0071672 A1* 6/2002 Omiya ........................ 396/348
2004/0062190 A1* 4/2004 Imai ............................ 369/291

FOREIGN PATENT DOCUMENTS

JP 2001-194574 7/2001
JP 2002-318338 10/2002

* cited by examiner

Primary Examiner—W. B. Perkey
Assistant Examiner—Chia-how Michael Liu
(74) Attorney, Agent, or Firm—Rader Fishman & Grauer PLLC; Ronald P. Kananen (57) ABSTRACT

Disclosed is a lens barrel structure comprises: a base; a lens barrel provided on the base; a lens moving mechanism provided in the lens barrel, the lens moving mechanism supporting a lens movably in an optical axis direction thereof and being supplied with a rotational drive force thereby to move the lens in the optical axis direction; a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and a detecting mechanism that detects a rotation speed of the motor. The detecting mechanism includes a sensing plate that is provided to the output shaft and that rotates integrally with the output shaft, and a detector that detects rotation of the sensing plate; and of gears included in the gear train, a first gear to mesh with the drive gear is supported in a cantilever support manner on the side of the base.

17 Claims, 10 Drawing Sheets

LENS BARREL STRUCTURE AND IMAGE CAPTURE APPARATUS

BACKGROUND OF THE INVENTION

1. Field of the Invention

The invention relates to a lens barrel structure and an image capture apparatus.

2. Description of the Related Art

In image capture apparatuses, such as digital still cameras and digital video cameras, a lens barrel structure is provided that includes an image capture optical system that contains lenses arranged in a lens barrel and an image device element that captures a subject image.

A lens barrel structure of the type described above has a lens moving mechanism and a lens drive mechanism. The lens moving mechanism holds lenses movably along an optical axis direction, and is supplied with a rotational drive force, thereby to move the lenses along the optical axis direction. The lens drive mechanism supplies the rotational drive force to the lens moving mechanism.

The lens drive mechanism includes, for example, a motor having an output shaft, and a gear train that meshes with a drive gear provided to the output shaft thereby to supply power of the motor to the lens moving mechanism.

In the event of controlling the lens moving mechanism, sensing is performed to sense, for example, the rotation amount and rotation direction of the motor. The sensing is performed by using a sensing plate provided to, for example, an output shaft of the motor or a rotation shaft constituting a gear train, and a detector that detects the rotation of the sensing plate. In this case, when attempting miniaturization, there arises the problem of interference between the sensing plate and the gear train.

As a related art structure including a sensing plate provided to an output shaft of a motor, there has been proposed a configuration that uses a motor of the type having output shafts individually extending from both ends of a housing of the motor. In this case, a drive gear is provided to the one output shaft, and a sensing plate is provided to the other output shaft, thereby to prevent the interference between the support axes of the sensing plate and the gear train (see Japanese Unexamined Patent Application Publication No. 2002-318338, for example).

In addition, as a related art structure, a configuration has been proposed wherein, in view of the fact that gears of a gear train are supported in an inboard (both-side) support manner in many cases, a rotation detection gear dedicated to mesh with a drive gear is newly provided, and a sensing plate rotatable integrally with the rotation detection gear is provided, thereby to prevent interference between the sensing plate and support axes of the gear train (see Japanese Unexamined Patent Application Publication No. 2001-194574, for example).

Nevertheless, however, in any one of the configurations described above, it is disadvantageous to accomplish the miniaturization because the occupation spacing for the sensing plate should be secured. In addition, in the latter configuration, the rotation detection gear to detect the motor rotation needs to be provided, thereby making it disadvantageous to implement, for example, reduction in the number of components and the miniaturization.

SUMMARY OF THE INVENTION

The present invention is made in view of the circumstances as described above and aims to provide a lens barrel structure and an image capture apparatus that are advantageous to implement reduction in the number of components and miniaturization.

One embodiment of the invention is directed to a lens barrel structure according to includes a base; a lens barrel provided on the base; a lens moving mechanism provided in the lens barrel, the lens moving mechanism supporting a lens movably in an optical axis direction thereof and being supplied with a rotational drive force thereby to move the lens in the optical axis direction; a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and a detecting mechanism that detects a rotation speed of the motor. The detecting mechanism includes a sensing plate that is provided to the output shaft and that rotates integrally with the output shaft, and a detector that detects rotation of the sensing plate. Of gears included in the gear train, a first gear to mesh with the drive gear is supported in a cantilever support manner on the side of the base.

In another embodiment, an image capture apparatus according to the invention includes a lens barrel structure that includes a lens, and an image capture device that captures a subject image having led by the lens. The lens barrel structure includes a base; a lens barrel provided on the base; a lens moving mechanism provided in the lens barrel, the lens moving mechanism supporting a lens movably in an optical axis direction thereof and being supplied with a rotational drive force thereby to move the lens in the optical axis direction; a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and a detecting mechanism that detects a rotation speed of the motor. The detecting mechanism includes a sensing plate that is provided to the output shaft and that rotates integrally with the output shaft, and a detector that detects rotation of the sensing plate. Of gears included in the gear train, a first gear to mesh with the drive gear is supported in a cantilever support manner on the side of the base.

According to the embodiment of the invention, the sensing plate is mounted to the output shaft of the motor, and the first gear that meshes with the drive gear of the output shaft is supported by the holder in the cantilever support manner. Accordingly, the sensing plate can be disposed by using front spacing of the drive gear. Consequently, occupation spacing for the sensing plate can be minimized when disposing the sensing plate, thereby making it advantageous to implement the miniaturization. Further, a rotation detection gear dedicated to detect the rotation of the motor need not be provided, therefore making it advantageous to implement the reduction in the number of components.

Other and further objects, features and advantages of the invention will appear more fully from the following description.

BRIEF DESCRIPTION OF THE DRAWINGS

FIG. 4, consisting of FIG. 4A, 4B and FIG. 4C, shows perspective views descriptive of the states a lens barrel;

FIG. 5, consisting of FIG. 5A 5B, and 5C, shows cross sectional views of the lens barrel;

DETAILED DESCRIPTION OF THE PREFERRED EMBODIMENT

A first embodiment of the invention will be described herebelow with reference to the accompanying drawings.

Figure 1:
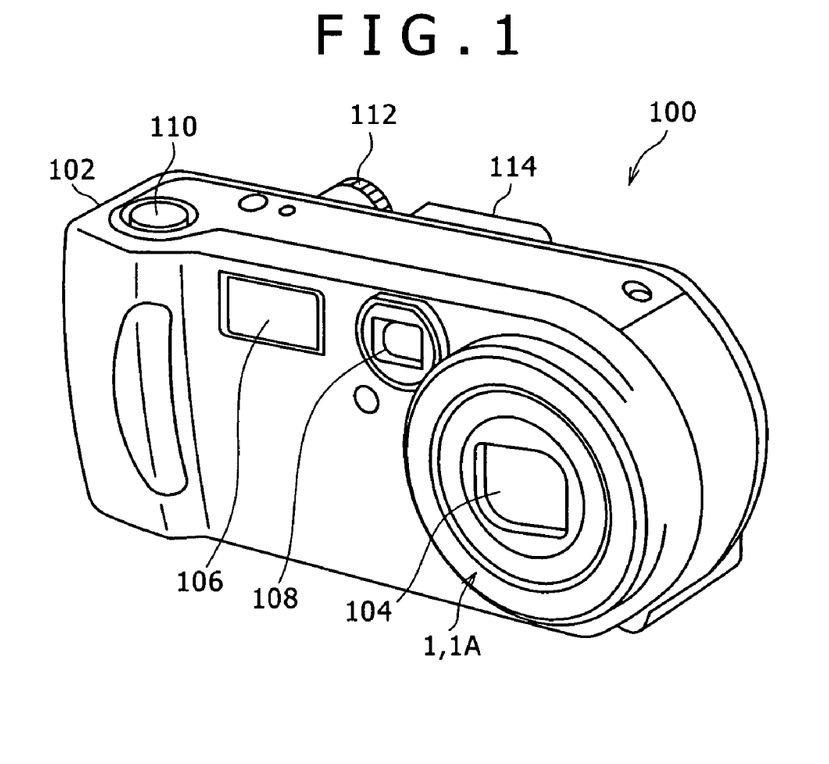
FIG. 1 is a perspective view of an image capture apparatus according to an embodiment of the invention.
Figure 2:
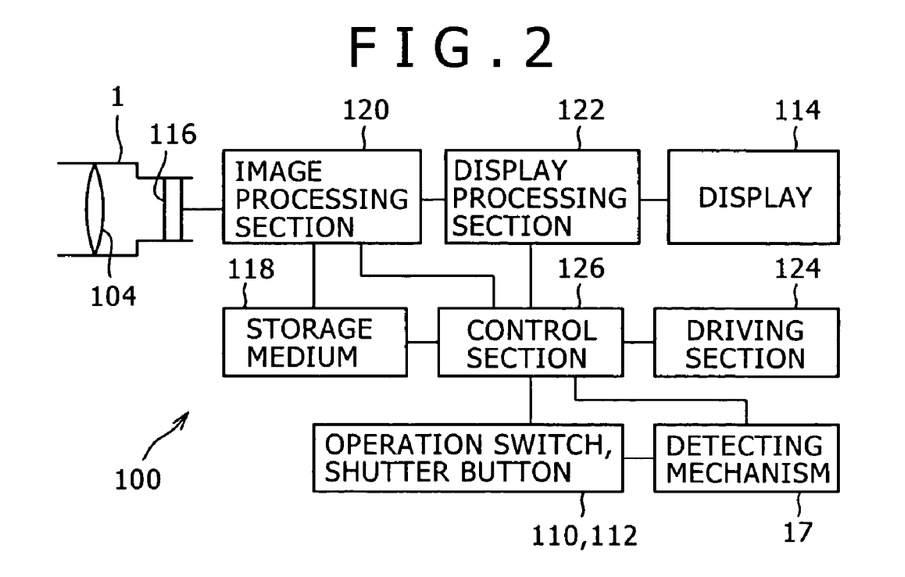
FIG. 2 is a block diagram showing the configuration of the image capture apparatus according to the embodiment.

FIG. 1 is a perspective view of an image capture apparatus 100 according to a first embodiment of the invention, and FIG. 2 is a block diagram showing the configuration of the image capture apparatus according to the first embodiment.

Referring to FIG. 1, the image capture apparatus 100 according to the first embodiment is a digital still camera and has an outer housing 102 constituting an exterior.

A lens barrel structure 1A (shown in FIG. 3 in more detail) is built in a right portion of the housing 102, and a lens barrel 1 is positioned in a rightward portion of a front face.

Components such as a flash portion 106 that produces flash light, and objective lenses 108 of an optical viewfinder 107 (shown in FIG. 3) are provided in upward portions of the front face.

A shutter button 110 is provided on an upper end face of the outer housing 102. Components such as a view window (not shown) of the optical viewfinder, a plurality of operation switches 112 for performing various operations such as switching of, for example, power on/off, image capture modes, and reproduction modes, and a display 114 (FIG. 2) are provided on a rear face of the outer housing 102.

As shown in FIG. 2, the image capture apparatus 100 has a configuration including, but not limited to, an image capture device 116 that is configured of, for example, a CCD (charge-coupled device) and CMOS sensors disposed in a rear end portion of the lens barrel 1 to capture a subject image formed by a photographing optical system 104; an image processing section 120 that generates image data in accordance with a capture signal having been output from the image capture device 116 and that performs recording the image data into a storage medium 118 such as a memory card; a display processing section 122 that causes the image data to be displayed on a display 114; a driving section 124 that performs drive control of a lens drive mechanism 10, which is described below; a detecting mechanism 17 that detects the rotation speed and rotation direction of a motor constituting a part of the lens drive mechanism 10; and a control section 126 that controls the image processing section 120, the display processing section 122, and the driving section 124 in response to the operation of, for example, an operation switch 112 or a shutter button 110.

An overall configuration of the lens barrel structure 1A will be described herebelow.

Figure 3:
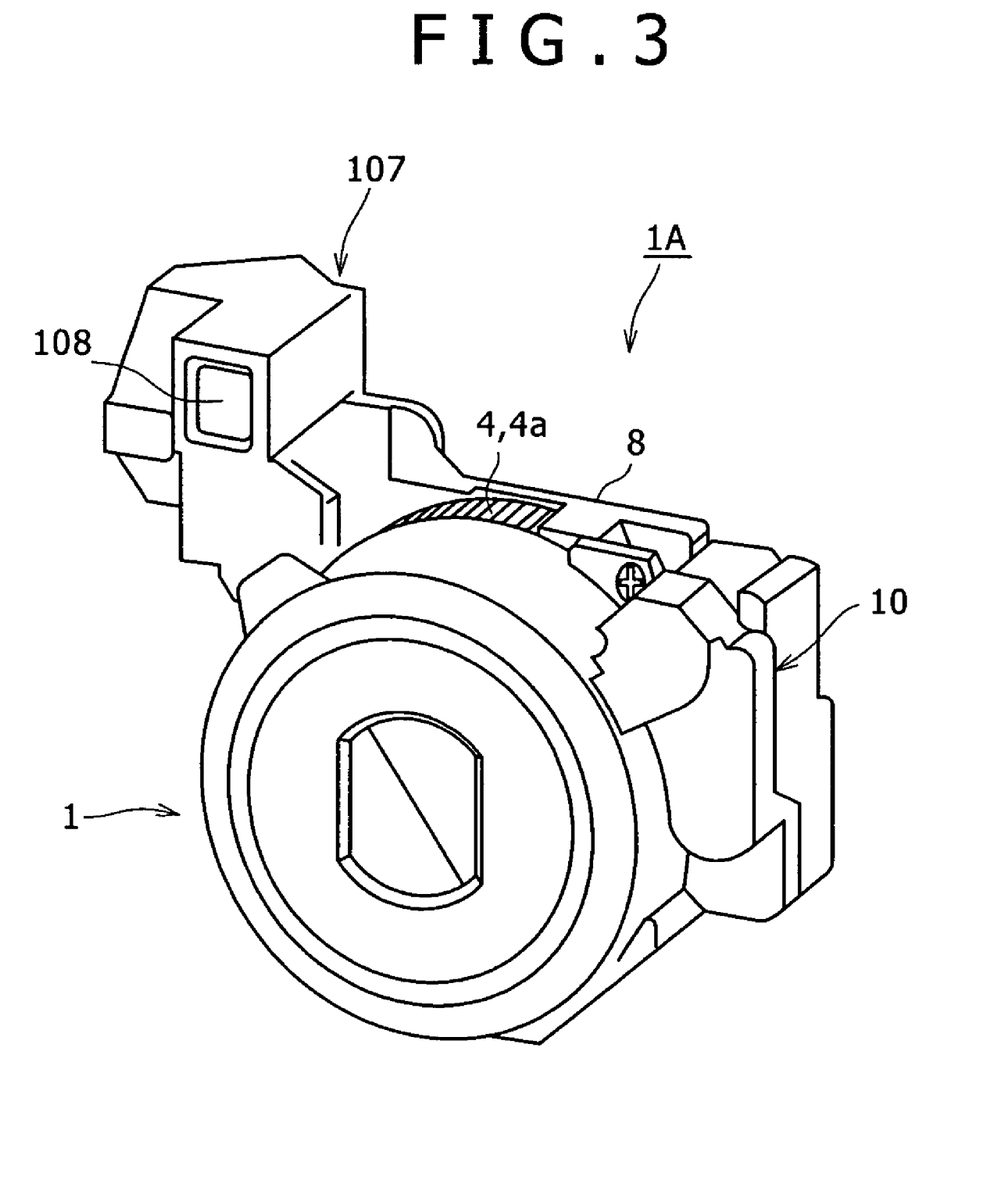
FIG. 3 is an exterior view of a lens barrel structure.
Figure 4A:
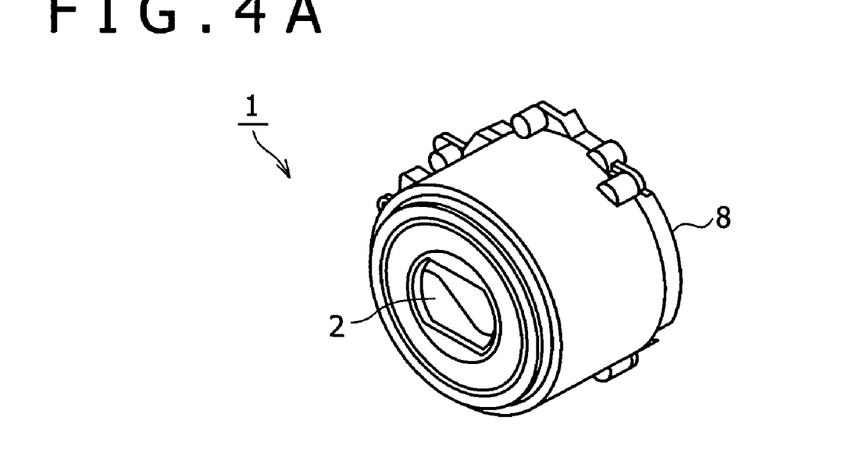
Figure 4B:
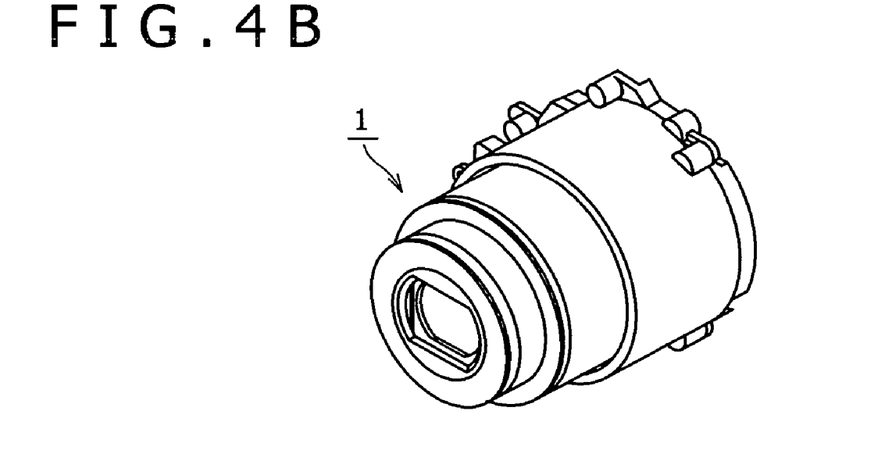
Figure 4C:
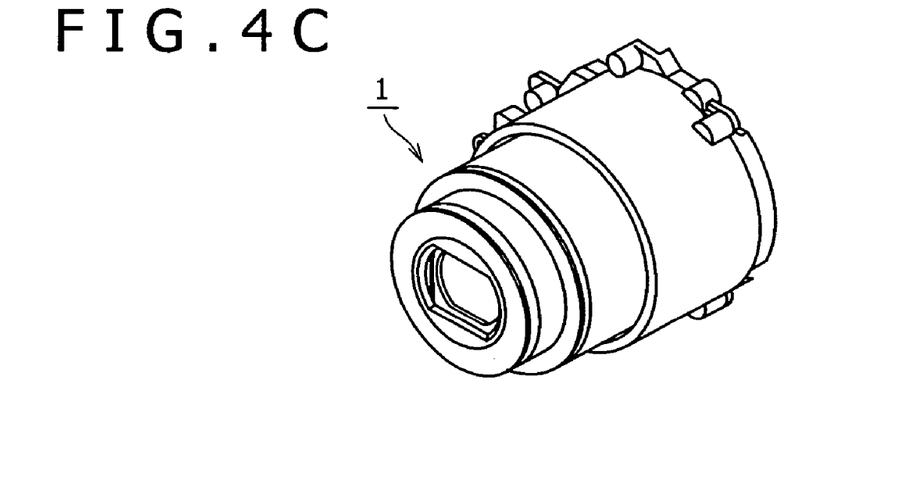
Figures 5A, 5B:
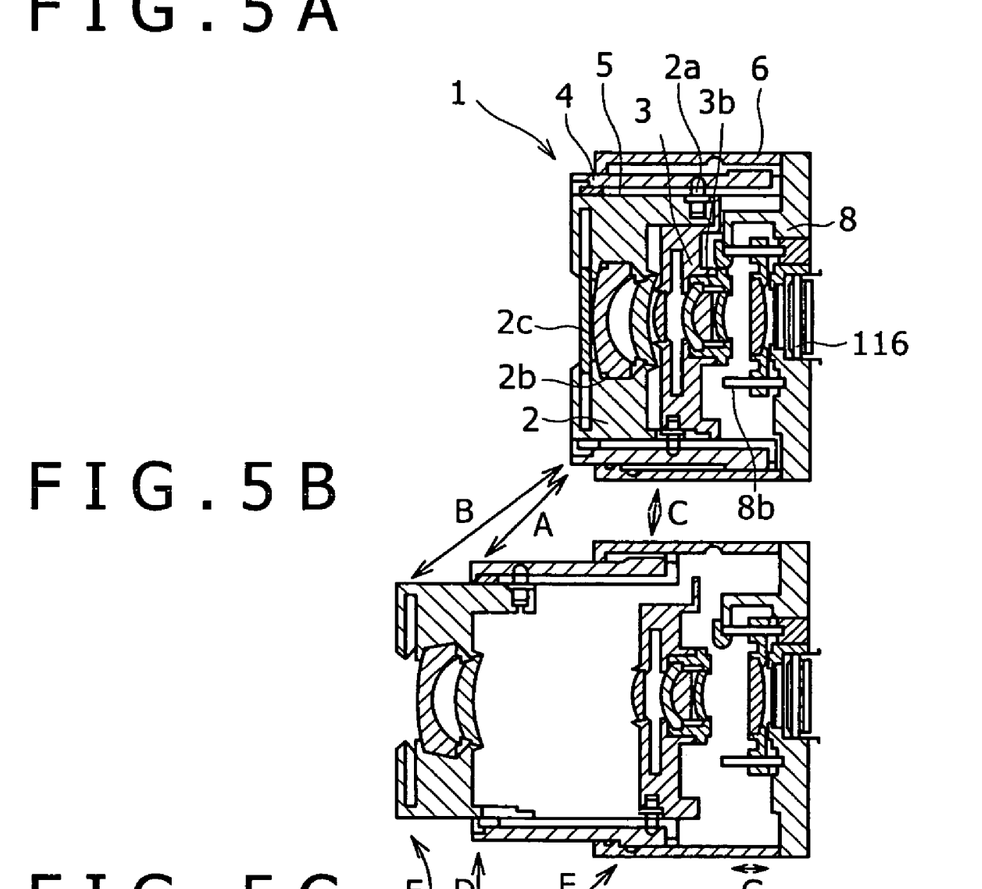
Figure 5C:
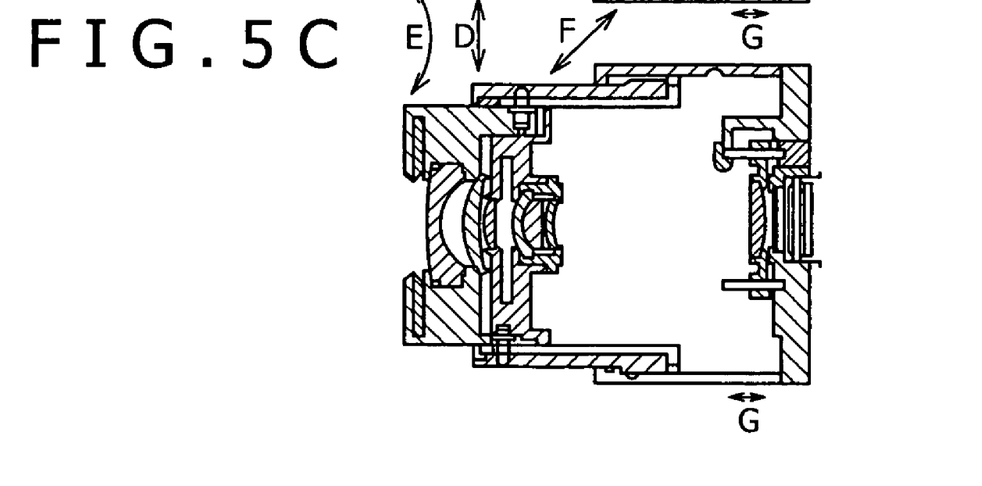
Figure 6:
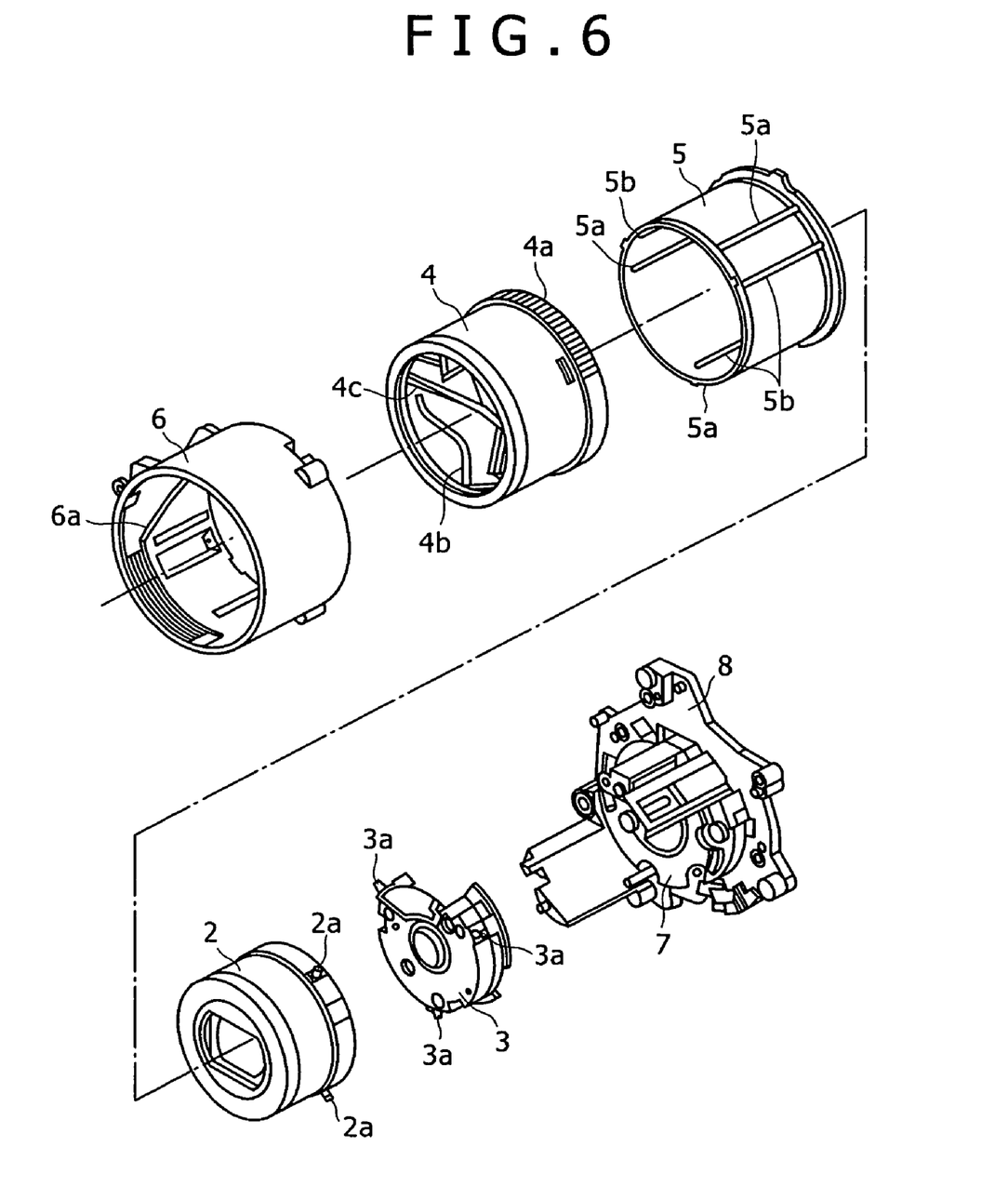
FIG. 6 is an exploded perspective view of the lens barrel.

FIG. 3 is an exterior view of the lens barrel structure 1A. FIG. 4 includes FIGS. 4A, 4B, and 4C individually showing descriptive perspective view of states of the lens barrel 1. More specifically, FIG. 4A shows a lens accommodated state in a non-use event, that is, a collapse or retraction state ("retraction state," hereafter) of the lens barrel 1; FIG. 4B showing a wide angle state thereof; and FIG. 4C is a telephoto state thereof. FIG. 5 includes FIGS. 5A, 5B, and 5C individually showing cross sectional views of the lens barrel 1. More specifically, FIG. 5A shows the retracted state of the lens barrel 1; 5B shows the wide angle state thereof; and 5C shows the telephoto state thereof. FIG. 6 is an exploded perspective view of the lens barrel 1.

With reference to FIG. 3, the lens barrel structure 1A includes a base 8 secured to the outer housing 102, and the retractable lens barrel 1 that accommodates and holds the photographing optical system 104.

In the lens barrel 1, a lens moving mechanism is provided that supports lenses movably along an optical axis direction thereof and that is supplied with a rotational drive force, thereby to move the lenses. A lens drive mechanism 10 for supplying the rotational drive force to the lens moving mechanism is provided in the base 8.

The lens barrel 1 is configured such that the lens barrel 1 extends and retracts between a use position (a wide angle state position, telephoto state position, or an intermediate position between the wide angle state and telephoto state positions) projecting forward from the front face of the outer housing 102 and an accommodation position (retraction state) accommodated on the front face of the outer housing 102.

With reference to FIG. 5, the lens barrel 1 has a three-group configuration in terms of optical system. More specifically, where a subject side is the frontside and the image capture device 116 side is a rearside with respect to the optical axis direction of the lens barrel 1, three groups constituting the lens barrel 1 are configured of a first group, a second group, and a third group that are arranged in that order from the frontside to the rearside.

The lens barrel 1 performs focusing in a manner that the first group and the second group are driven in the optical axis direction along a predetermined curve, and the third group undergoes a small amount of displacement in the optical axis direction. More specifically, the focal distance is varied in accordance with displacements of the first group and the second group, and a focus position offset caused in the focus position variation is corrected for in accordance with the displacement of the third group, thereby to obtain focusing.

As shown in FIGS. 5 and 6, a first group lens frame 2 includes three (a plurality of) cam pins 2a that are engaged with a cam groove 4b of a cam cylinder 4; a plurality of lens rooms 2b wherein a plurality of lenses constituting the first group are inserted and secured; and a barrier mechanism section 2c that protects a front lens at the time of accommodation or in the retraction state.

A second group lens frame 3 includes three (a plurality of) cam pins 3a that are engaged with cam grooves 4c of the cam cylinder 4; and a plurality of lens rooms 3b wherein a plurality of lenses constituting the second group are inserted and secured. The second group lens frame 3 may be configured with an iris shutter.

The cam cylinder 4 includes a gear portion 4a for rotationally driving the cam cylinder 4 in an inner circumference portion of a fixed cylinder 6; the three (plurality of) cam grooves 4b with which the cam pins 2a are engaged; three pieces (a plurality of) of the grooves 4c with which the cam pins 3a of the second group lens frame 3 are engaged; and three (plurality of) cam pins 4d to be engaged with cam grooves 6a of the fixed cylinder 6. In the present embodiment, the rotational drive force from the lens drive mechanism 10 is supplied to the gear portion 4a.

The cam grooves 4b and the cam grooves 4c move the first group and the second group along predetermined curves in the optical axis direction, thereby being used to perform zooming operation.

A linear-guide cylinder 5 is a member that moves integrally with the cam cylinder 4 along the inner wall of the fixed cylinder 6 in the optical axis direction. The linear-guide cylinder 5 includes guide grooves 5a that guide the first group lens frame 2 in the optical axis direction, and guide grooves 5b that guide the second group lens frame 3 in the second group lens frame 3.

The fixed cylinder 6 is a member secured to the base 8, and includes three pieces (plurality of) of the cam grooves 6a with which the cam pins 4d of the cam cylinder 4 are engaged.

A third group lens frame 7 includes a lens room for being used to insert and secure a lens 71 that constitutes the third group.

In the configuration, a movable lens (not shown) is guided in the optical axis direction by being held by a guide mechanism (not shown) to be movable along the optical axis direction with respect to the base 8, wherein the movable lens (not shown) is displaced a small amount by a drive mechanism (not shown) in the optical axis direction. The guide mechanism and the drive mechanism are not directly related to the essence of the invention, so that description thereof is omitted herefrom.

The fixed cylinder 6 is positioned and secured to the base 8.

The base 8 includes, for example, a recess portion that is used to insert, position, and secure an optical filter (not shown), such as an optical lowpass cut filter and an infrared cut filter. In addition, the base 8 includes a recess portion that is used to prevent entrance of dusts and the like into the lens barrel and to insert a seal rubber (not shown) for being used to urge the optical filter (not shown).

The image capture device 116 is positioned and secured with high accuracy to the base 8.

In the present embodiment, the lens moving mechanism is configured of the first group lens frame 2, the second group lens frame 3, the cam cylinder 4, the linear-guide cylinder 5, and the fixed cylinder 6.

In addition, in the present embodiment, the first group lens frame 2, the second group lens frame 3, the cam cylinder 4, the linear-guide cylinder 5, the fixed cylinder 6, the third group lens frame 7, and the base 8 are molded of, for example, fiber reinforced plastic of a polycarbonate resin (black) containing glass fiber, thereby having strength and light-shielding properties and mass-productivity.

Extention/retraction operation and zooming operation are performed responsively to the supply of the rotational drive force of the lens drive mechanism 10 to the gear portion 4a of the lens barrel 1.

Operation of the lens barrel 1 will be described herebelow.

In operation in the range between the retraction state and wide angle state positions, by supply of driving forces to the cam cylinder 4 from the lens drive mechanism 10, the cam pins 4d moves in the optical axis direction to the subject side while rotating along the cam grooves 6a of the fixed cylinder 6. At this time, the linear-guide cylinder 5 moves integrally with the cam cylinder 4 (see an arrow A in FIG. 5).

In this event, the first group lens frame 2 is driven such that the cam pins 2a moves along the cam grooves 4b and the guide grooves 5a in accordance with a predetermined curve (see an arrow B in FIG. 5). At this time, the second group lens frame 3 is driven such that the cam pins 3a moves along the cam grooves 4c and the guide grooves 5b in accordance with a predetermined curve (see an arrow C in FIG. 5). In accordance with the above, the first group and the second group are moved to predetermined positions, whereby the position is set to the optically wide angle position.

Also in operation in a range between the wide angle and telephoto positions, the cam cylinder 4 is driven such that the gear portion 4a is supplied with a driving force by the lens drive mechanism 10. However, the cam grooves 6a are formed to not allow the cam cylinder 4 to be driven in the range along the optical axis direction, whereby the linear-guide cylinder 5 also is not moved in the optical axis direction (see an arrow D in FIG. 5).

In this event, the first group lens frame 2 is driven such that the cam pins 2a are moved along the cam grooves 4b and the guide grooves 5a in accordance with the predetermined curve (see an arrow E in FIG. 5). At this time, the second group lens frame 3 is driven such that the cam pins 3a moves along the cam grooves 4c and the guide grooves 5b in accordance with the predetermined curve (see an arrow F in FIG. 5). In accordance with the above, the first group and the second group are optically moved along the predetermined curve and are optically moved in the range between the wide angle and telephoto positions, whereby the zooming operation is performed.

The telephoto→wide angle→retraction state is set in a manner that the lens drive mechanism 10 is driven in the opposite direction to the direction of the above operation, thereby to rotate the cam cylinder 4 in the opposite direction. In accordance with the driving of the cam cylinder 4 by the lens drive mechanism 10, the lens barrel 1 performs retraction operation and zooming operation. Independently of that operation, the movable lens (not shown) is displaced a small amount by the drive mechanism in the optical axis direction, thereby to performing focusing operation (see an arrow G in FIG. 5).

The configuration of the lens drive mechanism 10 will now be described in detail herebelow.

The lens drive mechanism 10 supplies the rotational drive force to the gear portion 4a, and the lens drive mechanism 10 includes a motor 12, a drive gear 14, and a gear train 16.

The detecting mechanism 17 detects the rotation speed and rotation direction of the motor 12, and is configured to include a sensing plate 18 and detectors 20.

Figure 7:
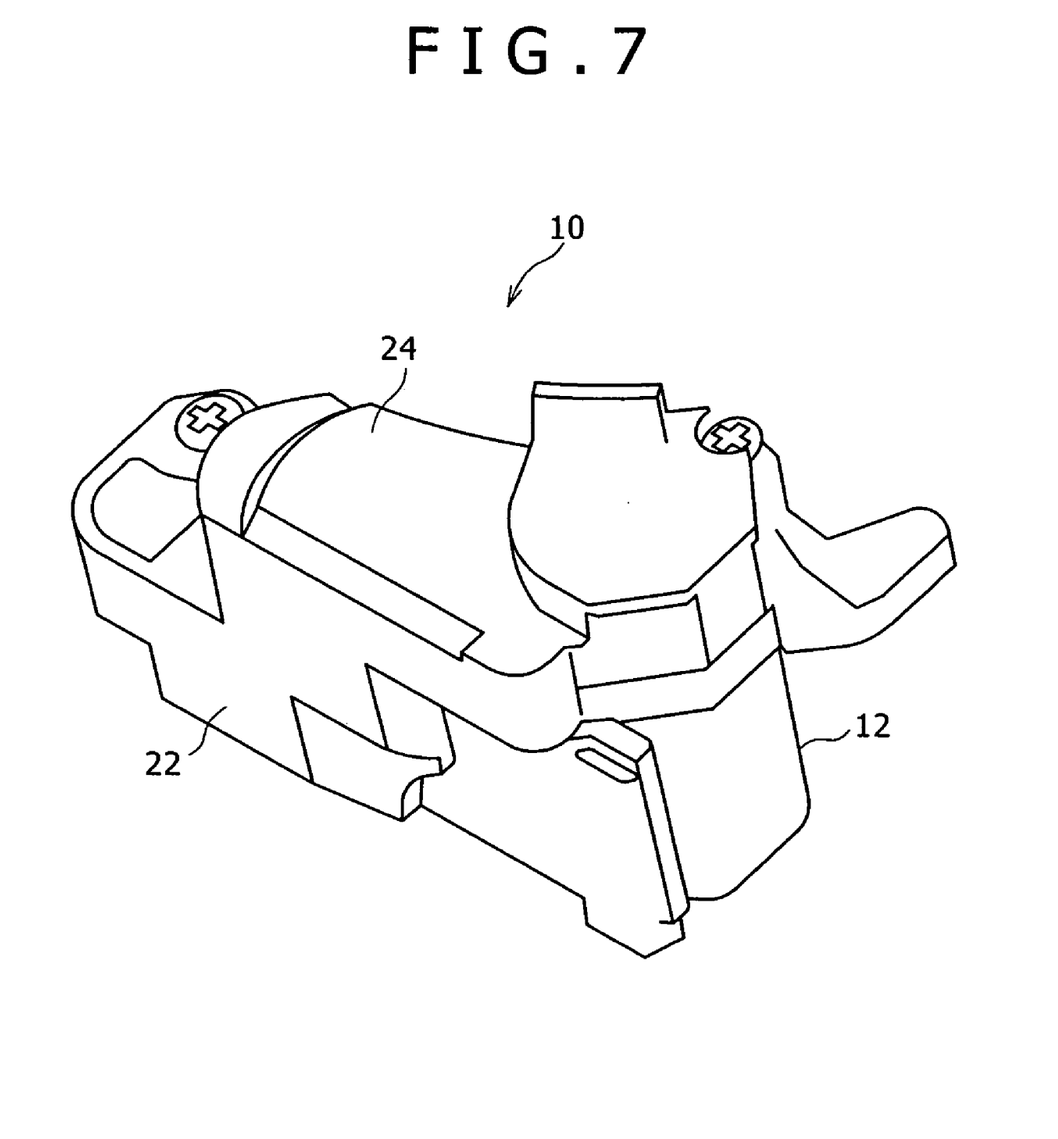
FIG. 7 is a perspective view of a lens drive mechanism.
Figure 8:
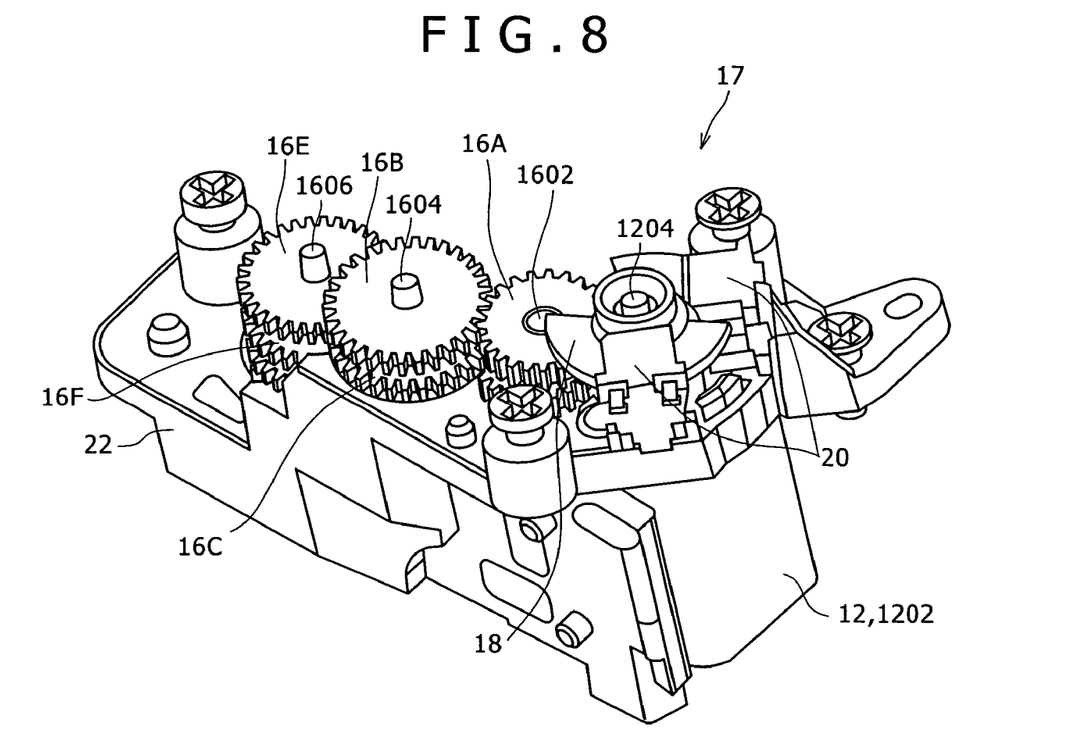
FIG. 8 is a perspective view showing a state where a lid plate is removed from the lens drive mechanism.
Figure 9:
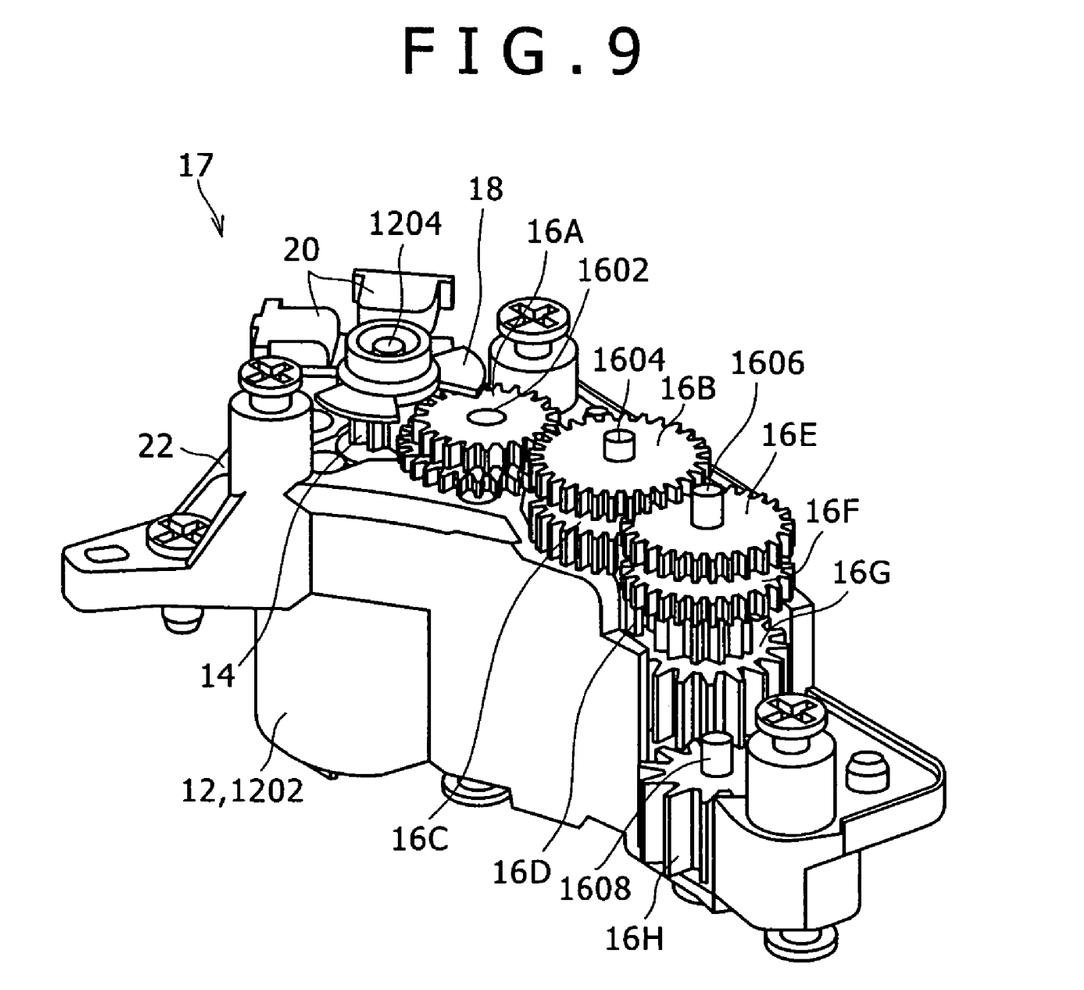
FIG. 9 is a perspective view showing a state where the lid plate is removed from the lens drive mechanism.
Figure 10:
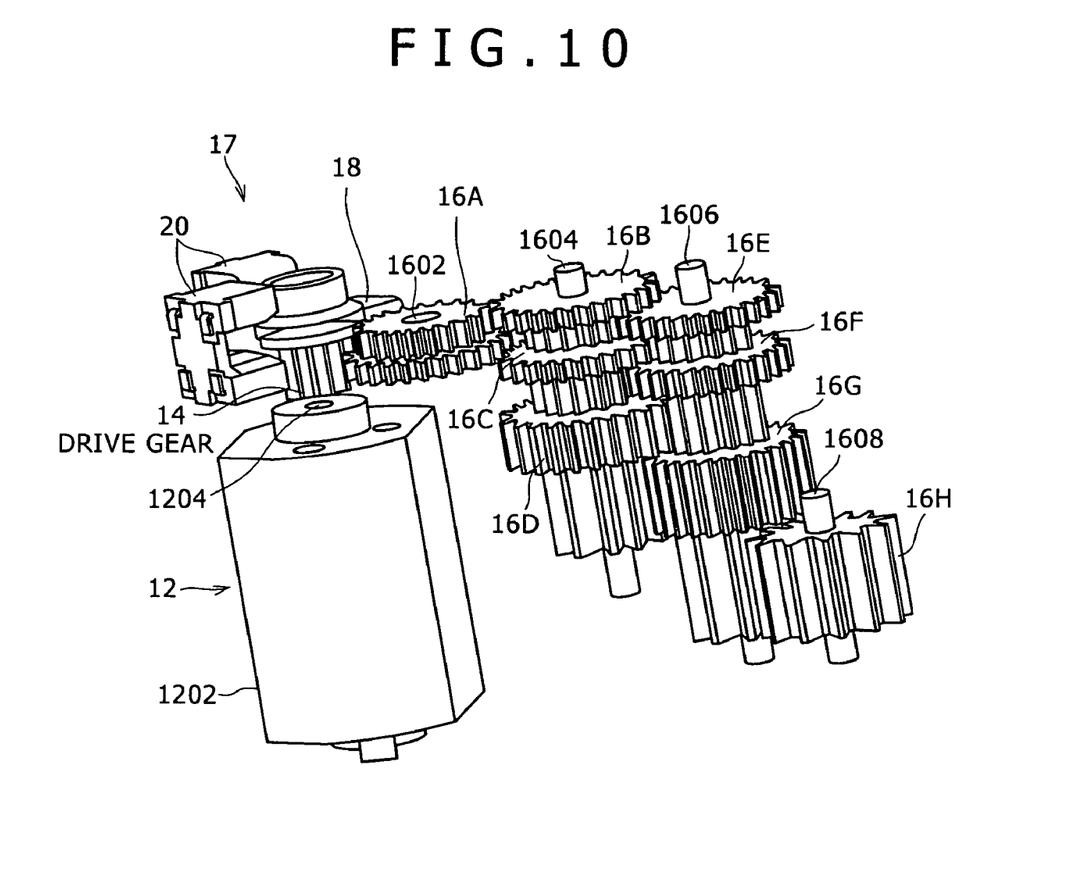
FIG. 10 is a perspective view showing a state where the lid plate and a holder are removed from the lens drive mechanism.
Figure 11:
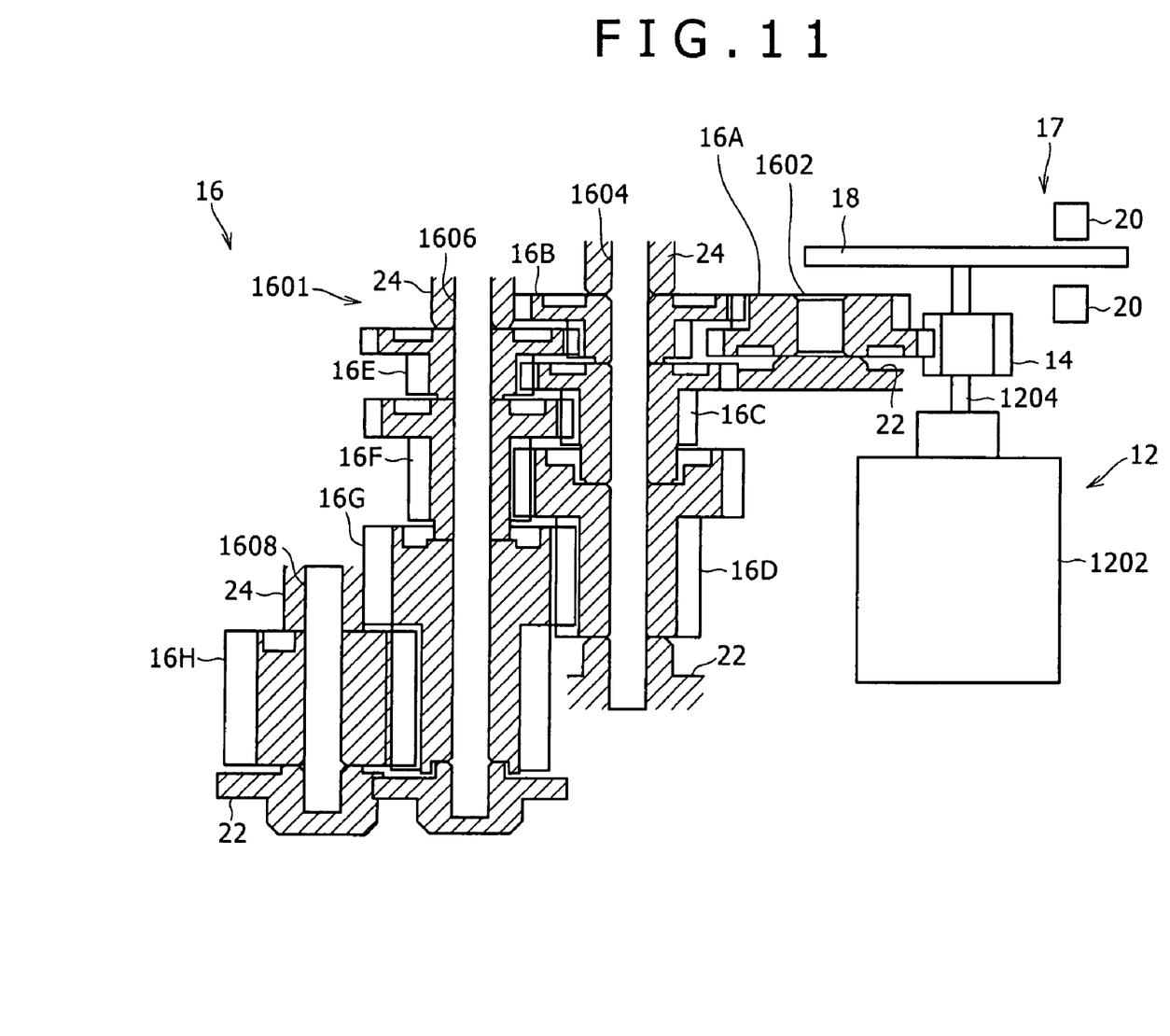
FIG. 11 is a descriptive view showing the configuration of the lens drive mechanism.

As shown in FIGS. 3, 7, and 8, a holder 22 is attached to a right portion of the base 8. The motor 12, the drive gear 14, the gear train 16, the sensing plate 18, and the detectors 20 are accommodated in the holder 22 and covered by a lid plate 24.

The motor 12 includes a housing 1202 held by a holder 22, and an output shaft 1204 extending from one end of the housing 1202. In the present embodiment, the output shaft 1204 is disposed along a direction parallel to the optical axis of the lens barrel 1, that is, in a front-rear direction (or, a cross direction) of the image capture apparatus 100.

The drive gear 14 is secured to a middle portion of the output shaft 1204 in the top direction thereof, and the sensing plate 18 is secured to an end (front end) of the output shaft 1204.

The sensing plate 18 is configured of three blades spaced apart at an interval from one another in the circumferential direction.

The detectors 20 are each configured of a light projection section that projects sensing light, and a light reception section that receives the sensing light, wherein the sensing plate 18 is positioned between the light projection section and the light receiving section. In the embodiment, two units of the detectors 20 are provided, and are individually attached in the holder 22. The output shaft 1204 is rotated by driving the motor 12, and the sensing plate 18 is passed between the light projection sections and the light receiving sections of the respective detectors 20, whereby the detectors 20 each generate a sense signal corresponding to the movement of the respective blade of the sensing plate 18. The control section 126 performs detection of the rotation speed and rotation direction of the motor 12 in accordance with the sense signal, and performs rotation control of the motor 12 through the driving section 124 in accordance with the detection result.

The gear train 16 transfers a rotational drive force of the motor 12 to the gear portion 4a of the cam cylinder 4, and has a configuration including a first gear 16A to mesh with the drive gear 14, a final gear 16H to mesh with the gear portion 4a, and gears 1601 to connecting between the first gear 16A and the final gear 16H.

In more detail, the first gear 16A is disposed rotatably on a support axis 1602 supported by the holder 22 in a cantilever support manner.

As shown in FIGS. 8 to 11, in the present embodiment, the sensing plate 18 is positioned in an seal rubber (not shown) portion of the first gear 16A, wherein an seal rubber (not shown) of the sensing plate 18 opposes seal rubber (not shown) portion of the support axis 1602. More specifically, as viewed seal rubber (not shown) the output shaft 1204, a profile of the sensing plate 18 and a profile of the first gear 16A partly overlap with each other, and the profile of the sensing plate 18 overlaps with an axial center of the first gear 16A. Seal rubber (not shown) Further specifically, a movement trajectory of the sensing plate 18 is positioned in seal rubber (not shown) portion of the first gear 16A, and an outer peripheral portion of the movement trajectory portion opposes seal rubber (not shown) of the support axis 1602. In other words, as viewed seal rubber (not shown) the output shaft 1204, the movement trajectory of the sensing plate 18 partly overlaps the profile of the first gear 16A, and the movement trajectory of the sensing plate 18 overlaps the axial center of the first gear 16A.

The final gear 16H is rotatably supported on a support axis 1608 supported by the holder 22 and the lid plate 24 in an inboard (both-side) support manner.

Two support axes 1604 and 1606 are disposed between support axis 1602 of the first gear 16A and the support axis 1608 of the final gear 16H. Thus, the support axis 1608 of the final gear 16H and the two support axes 1604 and 1608, that is, the three support axes 1608, 1604, and 1606 in total, are each supported by the two sides, and the gears 1601 are disposed on the two support axes 1604 and 1606.

Of the two support axes 1604 and 1606, on the support axis 1604 positioned closer to the support axis of the first gear 16A, a second gear 16B, a third gear 16C, and a fourth gear 16D are rotatably disposed.

Of the two support axes 1604 and 1606, on the support axis 1606 positioned closer to the support axis 1608 of the final gear 16H, a fifth gear 16E, a sixth gear 16F, and a seventh gear 16G are rotatably disposed.

A large-diameter gear portion of the second gear 16B meshes with the first gear 16A, a large-diameter gear portion of the fifth gear 16E meshes with a small-diameter gear portion of the second gear 16B, a large-diameter gear portion of the third gear 16C meshes with a small-diameter gear portion of the fifth gear 16E, a large-diameter gear portion of the sixth gear 16F meshes with a small-diameter gear portion of the third gear 16C, a large-diameter gear portion of the fourth gear 16D meshes with a small-diameter gear portion of the sixth gear 16F, a large-diameter gear portion of the seventh gear 16G meshes with a small-diameter gear portion of the fourth gear 16D, and the final gear 16H meshes with a small-diameter gear portion of the seventh gear 16G, whereby a rotational drive force of the motor 12 is transferred from the first gear 16A to the gear portion 4a through the second to seventh gears 16B to 16G and the final gear 16H from the first gear 16A, and the rotation speed of the motor 12 is reduced through the above-described seven stages.

Gear ratios in the gear train 16 are selected so that sufficient driving forces can be obtained throughout a retraction→wide angle→telephoto range and a telephoto→wide angle→retraction range.

For reducing noise occurring during operation between the drive gear 14 and the first gear 16A, the shift coefficient of the first gear 16A is preferably a negative value of −0.3 or less, more preferably a range of from −0.05 or less to −0.2 or greater, and still more preferably a range of from −0.08 or less to −0.1 or greater.

The strength is reduced when the shift coefficient of the first gear 16A is set to a negative value. However, since the first gear 16A is an initial-stage gear that meshes with the drive gear 14, the load to be exerted on the first gear 16A is low, so that no problems occur.

According to the present embodiment, the holder 22 is molded of a synthetic resin.

During rotational driving of the motor 12, a load imposing on the support axis 1602 of the first gear 16A is low, so that also the support axis 1602 of the first gear 16A is moded of the synthetic resin.

In addition, during the rotation of the motor 12, loads acting on the three support axes 1608, 1604, and 1606, support axis 1606 are higher than that acting on the support axis 1602. As such, the three support axes 1608, 1604, and 1606 are each formed of metal and is supported by the holder 22 and the lid plate 24 in an inboard (both-side) support manner.

According to the present embodiment, the sensing plate 18 is mounted to the output shaft 1204 of the motor 12, and the first gear 16A meshing with the drive gear 14 of the output shaft 1204 is supported in the cantilever support manner by the holder 22. As such, the sensing plate 18 can be disposed by using front spacing of the drive gear 14, so that unlike a related art structure, no spacing dedicated to dispose the sensing plate 18 in the portion of the housing positioned on the opposite side of the drive gear 14 needs to be secured. Accordingly, when disposing the sensing plate 18, occupation spacing for the sensing plate 18 can be minimized, thereby making it advantageous to implement miniaturization.

Further, unlike the related art structure, a dedicated rotation detection gear need not be provided to detect the rotation of the motor 12, thereby making it advantageous to implement the reduction in the number of components.

Further, as viewed from the top of the output shaft 1204, the disposition of the sensing plate 18 is made so that the profile of the sensing plate 18 and the first gear 16A partly overlap with each other, or more specifically, the disposition thereof is made so that the profile of the movement trajectory of the sensing plate 18 and the profile of the first gear 16A partly overlap with each other. In this case, for disposing the sensing plate 18, the disposition makes it further advantageous to minimize the occupation spacing for the sensing plate 18, and makes it further advantageous to implement the miniaturization.

Further, in the embodiment, as viewed from the top of the output shaft 1204, disposition is made so that the profile of the sensing plate 18 and the axial center of the first gear 16A overlap with each other, or more specifically, the disposition is made so that the profile of the movement trajectory of the sensing plate 18 and the axial center of the first gear 16A partly overlap with each other. In this case, the disposition makes it further advantageous to minimize the occupation spacing for the sensing plate 18, and makes it further advantageous to implement the miniaturization.

Further, according to the embodiment, in the first gear 16A, the large-diameter gear portion is positioned on the side of the holder 22, and the small-diameter gear portion is positioned on the side of the lid plate 24. Concurrently, in the second gear 16B, the small-diameter gear portion is positioned on the side of the holder 22, the large-diameter gear portion is positioned on the side of the lid plate 24, the large-diameter gear portion of the first gear 16A is disposed on the outer side in the radial direction of the small-diameter gear portion of the second gear 16B. More specifically, as viewed from the top of the support axis, the large-diameter gear portion of the first gear 16A and the profile of the large-diameter gear portion of the second gear 16B are disposed to partly overlap with each other, so that the gear train 16 in the direction of the support axis 1602, support axis 1604 is compacted.

The present embodiment has been described with reference to the case where the lens moving mechanism is configured of the first group lens frame 2, the second group lens frame 3, the cam cylinder 4, the linear-guide cylinder 5, and the fixed cylinder 6. However, the lens moving mechanism is not limited to the configuration according to the embodiment, but various known mechanisms developed in the past may be employed.

Further, the embodiment has been described by reference to the digital still camera as the image capture apparatus, the invention is adaptable to video cameras and various other image capture apparatuses.

The foregoing invention has been described in terms of preferred embodiments. However, those skilled, in the art will recognize that many variations of such embodiments exist. Such variations are intended to be within the scope of the present invention and the appended claims.

What is claimed is:

1. A lens barrel structure comprising:
   a base;
   a lens barrel provided on the base;
   a lens moving mechanism provided in the lens barrel, the lens moving mechanism supporting a lens movably in an optical axis direction thereof and being supplied with a rotational drive force thereby to move the lens in the optical axis direction;
   a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and
   a detecting mechanism that detects a rotation speed of the motor, wherein
   the detecting mechanism includes a sensing plate that is mounted to the output shaft of the motor and that rotates integrally with the output shaft, and a detector that detects rotation of the sensing plate; and
   of gears included in the gear train, a first gear to mesh with the drive gear is supported in a cantilever support manner on the side of the base, wherein, as viewed from a top of the output shaft of the motor, a profile of the sensing plate overlaps with an axial center of the first gear, the sensing plate being disposed in the portion of the housing positioned on the opposite side of the drive gear.

2. A lens barrel structure according to claim 1, wherein, as viewed from a top of the output shaft of the motor, a profile of the sensing plate and a profile of the first gear partly overlap with each other.

3. A lens barrel structure according to claim 1, wherein, as viewed from a top of the output shaft of the motor, a movement trajectory of the sensing plate and a profile of the first gear partly overlap with each other.

4. A lens barrel structure according to claim 1, wherein, as viewed from a top of the output shaft of the motor, a movement trajectory of the sensing plate overlaps with an axial center of the first gear.

5. A lens barrel structure according to claim 1, wherein
   the gear train is accommodated in an inner portion of a holder attached to the base; and
   the inner portion of the holder is closed by a lid plate attached to the holder.

6. A lens barrel structure according to claim 1, wherein
   the gear train is accommodated in an inner portion of a holder attached to the base;
   the detector is supported by the holder and is accommodated in an inner portion of the holder; and
   the inner portion of the holder is closed by a lid plate attached to the holder.

7. A lens barrel structure according to claim 1, wherein
   the gear train is accommodated in an inner portion of a holder attached to the base and molded of synthetic resin;
   the inner portion of the holder is closed by a lid plate attached to the holder; and
   the support axis is molded of the synthetic resin integrally with the holder.

8. A lens barrel structure according to claim 1, wherein
   the gear train is accommodated in an inner portion of a holder attached to the base and molded of synthetic resin; and
   the inner portion of the holder is closed by a lid plate attached to the holder
   the support axis is molded of the synthetic resin integrally with the holder; and
   the gear train includes, in addition to the first gear, a plurality of gear train support axes in parallel to a support axis of the first gear, and gear groups disposed on the plurality of gear train support axes, wherein the plurality of gear train support axes are made of metal and are supported by the holder and the lid plate in an inboard support manner.

9. An image capture apparatus comprising a lens barrel structure that includes a lens, and an image capture device that captures a subject image having led by the lens, the lens barrel structure including:
   a base;
   a lens barrel provided on the base;
   a lens moving mechanism provided in the lens barrel, the lens moving mechanism supporting a lens movably in an optical axis direction thereof and being supplied with a rotational drive force thereby to move the lens in the optical axis direction;

a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and a detecting mechanism that detects a rotation speed of the motor, wherein the detecting mechanism includes a sensing plate mounted to the output shaft of the motor and that rotates integrally with the output shaft, and a detector that detects rotation of the sensing plate; and of gears included in the gear train, a first gear to mesh with the drive gear is supported in a cantilever support manner on the side of the base wherein as viewed from a top of the output shaft of the motor, a profile of the sensing plate overlaps with an axial center of the first gear, the sensing plate being disposed in the portion of the housing positioned on the opposite side of the drive gear.

10. An image capture apparatus comprising a lens barrel structure that includes a lens, and an image capture device that captures a subject image having led by the lens, the lens barrel structure as set forth in claim 9, further including, as viewed from a top of the output shaft of the motor, a movement trajectory of the sensing plate overlaps with an axial center of the first gear.

11. A lens barrel structure comprising:

a base;

a lens barrel provided on the base;

a lens moving mechanism provided in the lens barrel, the lens moving mechanism supporting a lens movably in an optical axis direction thereof and being supplied with a rotational drive force thereby to move the lens in the optical axis direction;

a lens drive mechanism provided to the base, the lens drive mechanism supplying the lens moving mechanism with the rotational drive force, and including a motor including an output shaft, a drive gear provided to the output shaft, and a gear train that meshes with the drive gear to supply motive power of the motor to the lens moving mechanism; and a detecting mechanism that detects a rotation speed of the motor, wherein the detecting mechanism includes a sensing plate mounted to the output shaft of the motor and that rotates integrally with the output shaft, and a detector that detects rotation of the sensing plate; and of gears included in the gear train, a first gear to mesh with the drive gear is supported in a cantilever support manner on the side of the base, wherein, as viewed from a top of the output shaft of the motor, a movement trajectory of the sensing plate mounted to the output shaft of the motor overlaps with an axial center of the first gear, said output shaft being about parallel to said optical axis, and said sensing plate being disposed in the portion of the housing positioned on the opposite side of the drive gear.

12. A lens barrel structure according to claim 11, wherein, as viewed from a top of the output shaft of the motor, a profile of the sensing plate and a profile of the first gear partly overlap with each other.

13. A lens barrel structure according to claim 11, wherein, as viewed from a top of the output shaft of the motor, a movement trajectory of the sensing plate and a profile of the first gear partly overlap with each other.

14. A lens barrel structure according to claim 11, wherein the gear train is accommodated in an inner portion of a holder attached to the base; and the inner portion of the holder is closed by a lid plate attached to the holder.

15. A lens barrel structure according to claim 11, wherein the gear train is accommodated in an inner portion of a holder attached to the base;

the detector is supported by the holder and is accommodated in an inner portion of the holder; and the inner portion of the holder is closed by a lid plate attached to the holder.

16. A lens barrel structure according to claim 11, wherein the gear train is accommodated in an inner portion of a holder attached to the base and molded of synthetic resin;

the inner portion of the holder is closed by a lid plate attached to the holder;

and the support axis is molded of the synthetic resin integrally with the holder.

17. A lens barrel structure according to claim 11, wherein the gear train is accommodated in an inner portion of a holder attached to the base and molded of synthetic resin;

the inner portion of the holder is closed by a lid plate attached to the holder;

the first gear is disposed on a support axis supported by the holder in a cantilever support manner;

the support axis is molded of the synthetic resin integrally with the holder; and the gear train includes, in addition to the first gear, a plurality of gear train support axes in parallel to a support axis of the first gear, and gear groups disposed on the plurality of gear train support axes, wherein the plurality of gear train support axes are made of metal and are supported by the holder and the lid plate in an inboard (both-side) support manner.

* * * * *